(Model.)

H. BAUGHMAN.
MOP HOLDER.

No. 257,638. Patented May 9, 1882.

Witnesses:
W. W. Mortimer
W. H. Kerr

Inventor:
Henry Baughman,
per
F. A. Lehmann,
atty.

UNITED STATES PATENT OFFICE.

HENRY BAUGHMAN, OF COLUMBUS, OHIO.

MOP-HOLDER.

SPECIFICATION forming part of Letters Patent No. 257,638, dated May 9, 1882.

Application filed March 6, 1882. (Model.)

*To all whom it may concern:*

Be it known that I, HENRY BAUGHMAN, of Columbus, in the county of Franklin and State of Ohio, have invented certain new and useful Improvements in Mop-Holders; and I do hereby declare the following to be a full, clear, and exact description of the invention, such as will enable others skilled in the art to which it pertains to make and use it, reference being had to the accompanying drawings, which form part of this specification.

My invention relates to an improvement in mop-holders; and it consists, first, in the combination of the lower jaw having a screw-threaded stem formed as a part of it and suitable guides formed upon its top, the upper jaw, screw-socket having a ratchet formed on its outer surface, and a dog that is pivoted in a flange formed on the upper jaw; second, in the combination of the jaw A, having the screw-stem formed on its center, the upper jaw provided with a flange and a dog, and a screw-socket having a ratchet formed upon its lower edge, as will be more fully described hereinafter.

The object of my invention is to produce a mop-holder in which jaws are screwed together and then locked by means of a dog and ratchet, and the two jaws may be entirely separate from each other, so that the upper one can be entirely removed for the purpose of inserting the cloth between them.

Figure 1:
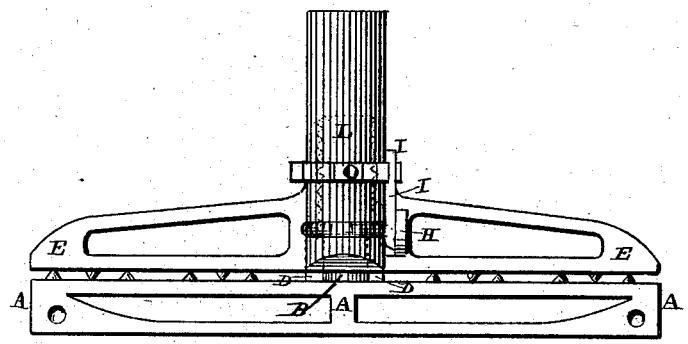
Figure 2:
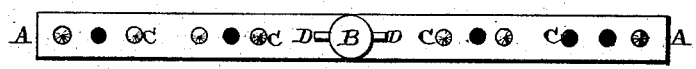
Figure 3:
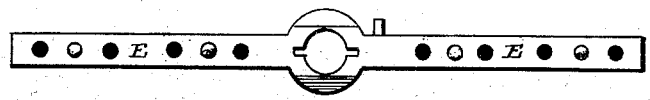

Figure 1 is a side elevation of my invention complete. Fig. 2 is a plan view of the lower jaw, showing the guides upon the same. Fig. 3 is a plan view of the upper jaw.

A represents the lower jaw, which is provided with a stem, B, at its center, and with a series of sharp points or projections, C, along its top. The stem B is made screw-threaded at its upper end, and upon opposite sides of the stem are formed fins or guides D, which serve to cause the upper jaw, E, to always keep in line with the lower one while being moved. The upper jaw, E, slips freely down over the top of the stem, and has grooves made in opposite sides of the hole through its center, so as to catch over the fins or guides. Upon the under side of the jaw are also formed suitable sharp points or projections, which catch in suitable recesses made in the top part of the lower jaw, A, and this jaw has suitable recesses formed in its surface for the sharp projections C on the lower jaw to catch in. Formed upon one side of the jaw is the flange H, through the lower end of which is made a hole, in which is fastened the lower end of the pawl I. This pawl consists of a straight rod, which has its lower end bent so as to pass through the flange, and which can be moved freely in and out, as upon a pivot. Rigidly secured to the lower end of the handle is the screw-socket L, which has the ratchet-teeth O formed around its lower edge. When this socket is screwed down upon the upper screw-threaded portion of the stem B the two jaws are clamped tightly together upon the cloth which is held between them, and in order to prevent the jaws from turning around and thus becoming loose, a dog or pawl is made to catch in this ratchet, and thus hold the jaws in any position to which they may be adjusted.

By making the stem B upon the middle of the lower jaw, where a large cloth is used a hole should be cut through its center, so as to allow the stem to pass up through it, and then the cloth will be held in such a manner that it cannot possibly become detached from the holder, even if the jaws should become loose.

If desired, two or more separate rags or cloths may be secured upon opposite sides of the stem. There being no projection of any kind upon the lower part of the lower jaw, every part of this jaw will come freely in contact with the floor, which is a very great advantage.

Having thus described my invention, I claim—

1. In a mop-holder, the combination of the lower jaw, A, having the stem B and guides D formed upon the center of its top edge, with the upper jaw, E, screw-socket L, provided with ratchet O, and the dog I, pivoted in the flange H, substantially as described.

2. The combination of the jaw A, having the screw-stem formed upon its center, the upper jaw provided with a flange and a dog, and the screw-socket having a ratchet formed upon its lower edge, substantially as set forth.

In testimony whereof I affix my signature in presence of two witnesses.

HENRY BAUGHMAN.

Witnesses:
J. F. HOFFMAN,
J. S. GOLD.